United States Patent Office 3,306,762
Patented Feb. 28, 1967

3,306,762
MANUFACTURE OF CARBON BLACK
Theodore A. Ruble, Houston, Tex., assignor to Continental Carbon Company, Houston, Tex., a corporation of Delaware
No Drawing. Filed Feb. 25, 1965, Ser. No. 435,366
12 Claims. (Cl. 106—307)

This is a continuation-in-part of application Serial No. 152,612 filed November 15, 1961, now abandoned. This invention relates to a process for producing an improved carbon black. More particularly, the present invention concerns a thermal decomposition method and more specifically, the furnace process for producing a rubber reinforcing grade of carbon black from a hydrocarbon source thereof wherein the physical characteristics of the resultant carbon black particles are beneficially modified by effecting the underlying pyrolysis reaction in the presence of relatively small quantities of either aluminum, indium, gallium, or mixtures thereof, especially mixtures of indium and gallium.

Upwards of 90 percent of the present day production of carbon black is used for compounding with rubber. In turn, a major portion of such compounded compositions is used in the manufacture of vehicle tires. Carbon black is not strictly an inert filler in the various rubber compositions in which it is employed. To the contrary, certain inherent properties of the black significantly affect important properties of the compounded and cured rubber. Therefore, the primary object of this invention is to provide a process for obtaining an improved carbon black having particular usefulness in the manufacture of automobile tires.

One of the several defined properties of rubber grade carbon blacks having a significant influence upon the characteristics of the cured rubber composition is that which is generally termed structure. A more precise definition of this inherent property of carbon black may be expressed as its tendency to agglomerate. X-ray analysis of carbon black reveals its ultimate structure to be that of a crystallite which on the average is composed of three or four parallel layer planes. The various grades of carbon black show distinct differences in regard to the extent that these individual crystallites will agglomerate, that is, combine with one another to form a chain of the crystallite units. Structure is, as inferred, also characterized by the manner in which it affects the physical properties of the compounded rubber composition. For example, the greater the amount of structure of the carbon black, the smoother will be the extruded rubber composition and less will be the extrusion shrinkage thereof. These are the main beneficial effects of structure. On the minus side, however, structure contributes to heat build-up tendencies and depresses the rebound characteristics of the rubber composition. Thus, automobile tires containing high structure blacks provide inferior riding qualities. Additionally, the use of high structure carbon blacks is such an application increases the possibilities of sudden rupture due to any excessive heat build-up which may be experienced under certain operating conditions. Accordingly, a more specific objective of this invention is to provide a method for preparing rubber reinforcing carbon black exhibiting low structure characteristics.

Heretofore, the carbon black manufacturer had only an extremely limited ability to alter the structure characteristics of carbon black produced by any given process. This, however, does not mean that there is no difference between the various grades of carbon black with respect to the property of structure. It was well known that the so-called thermal blacks exhibit the lowest structure of any of the commercial blacks. Nevertheless, the poor rubber reinforcing characteristics of this type black precludes its use in most rubber compounding applications. Channel blacks, which are regarded as excellent reinforcing grades of black, possesses only somewhat higher structure than the thermal blacks but the drawback to its use is a significant economic one as they are relatively costly to produce.

The most important grade of carbon black for use in compounding with rubber are the furnace blacks which were developed at about the time of the advent of synthetic rubber. This type of black is especially suited for compounding with all of the synthetic rubbers. Furnace blacks are comparatively inexpensive to produce since they are derived from by-products of the petroleum industry in excellent yields. In common with all other methods for producing carbon black, very little can be done to control the degree of structure exhibited by the product prepared by the furnace process. Variations of the reaction temperature, preheat temperature, turbulent conditions, etc. generally influence certain qualities of the black, such as particle size, noncarbon content, etc., but have negligible effect on its structure properties. It is likewise known that structure is somewhat influenced by the nature of the carbon producing feedstock. For example, the preferred type of feedstock in this process; namely, the highly aromatic residual oils, produces carbon blacks exhibiting higher structure than feedstocks composed predominantly of paraffinic-type hydrocarbons. But to achieve improved structure properties by utilizing paraffinic-type feedstocks or blends thereof with the aromatic residual oils, poses serious economic disadvantages.

A development has recently been made in the carbon black manufacturing field whereby the structure of any given type of carbon black can be controlled during the course of the formation of the black. Prior investigators have found that when an alkali metal, and preferably a compound thereof, is present in the reaction sphere where dissociation of the carbon producing feedstock commences, the structure of the carbon particles produced in such an environment is markedly decreased.

I have by this present invention found that certain metals other than the alkali metals may be similarly used to advantage in beneficially controlling the structure characteristics of carbon blacks, notwithstanding the assertion in the prior art that no other metals will perform satisfactorily. It is believed that the fundamental mechanism of the control accomplished by the metallic ions present in the reaction sphere is that the ions combine with the carbon particles as soon as they are formed. As a consequence, a substantial portion of the carbon particles become positively charged thereby repelling each other, thus reducing the chance of collision with one another with the result of lessening chain growth tendencies. More details with respect to the suitable metals contemplated herein and the manner in which they are used in the practice of this invention will be set forth hereinbelow after a brief discussion of the preferred manner contemplated for producing the carbon black.

The preferred carbon black process for the implementation of this invention is the so-called oil furnace process. Basically, this process involves burning a carbon producing feedstock, generally a normally liquid hydrocarbon, in a furnace with a deficiency of air. However, in most commercial adaptations of this process, a turbulent mixture of burning fuel gas and air is established in a suitable reactor into which the carbon producing feedstock is injected. I prefer to employ a variant of the aforementioned method wherein the turbulent burning mixture is established in a tubular-shaped reactor in such a manner whereby a whirling or cyclonic flow is imparted thereto and into the center core or eye of which the hydrocarbon make is injected. The patent literature is replete with teachings relative to the oil furnace method of producing carbon black and suitable devices for carrying out such methods including the cyclonic flow variations.

Since the furnace method is preferred in practicing the instant invention, there is also a definite preference for a specific type of feedstocks or carbon black makes. While any type of vaporous hydrocarbon can be introduced into the furnace under the conditions as aforedescribed, the preferred feedstocks comprise the various petroleum residua obtained in a number of petroleum operations, as for example, the bottoms derived in a thermal or catalytic cracking of cycle oils and the like. These residua are more commonly referred to as residual oils, pitches or tars and are mainly chemically characterized by exhibiting a high degree of aromaticity, e.g., hydrocarbons containing a hydrogen to carbon ratio less than about 1.25, and also exhibiting relatively high specific gravity, preferably less than about 10° API. In addition to these preferred types of carbon black producing feedstocks, use can also be made of hydrocarbon distillates such as kerosene, other heavy or light straight-run naphthas, cycle oils and the like. Also, where the ultimate in structure reduction is desired, normally gaseous hydrocarbons such as natural gas, propane, butane, etc., can be used. These normally gaseous materials can, of course, be used in combination with any of the normally liquid hydrocarbons enumerated hereinabove. It should be obvious from the foregoing that when I refer hereinafter to a vaporous hydrocarbon producing feedstock, I contemplate all feedstocks in the fluid state including besides normally gaseous hydrocarbons, vaporized normally liquid hydrocarbons, atomized hydrocarbon distillates or residual oils and mixtures of these various forms.

The metal structure modifiers that can be employed in accordance with this invention include: aluminum, indium, gallium or mixtures thereof. The ions corresponding to the above-enumerated metals, when present at the situs of the dissociation of the carbon producing feedstock, are believed to control the agglomeration tendency of the nascent carbon black particles in the manner hypothesized above.

The metal can be introduced into the reactor in elementary form or as any compound thereof capable of breaking down under the temperature conditions experienced in the furnace process to yield an ionic form of the metal. If a compound of the metal is used, the cation portion thereof does not have an observable effect upon control of structure.

The amounts of the metals that can be used vary over wide limits ranging from about 50 to 100,000 parts per million parts of the carbon black produced. The exact quantity to be used in any given instance will depend upon the particular degree of structure reduction desired and upon the specific metal utilized. The preferred maximum quantity of any of the metals that can be used is dependent upon the quantity of ash that can be tolerated in the finished carbon black. Generally, most users of rubber reinforcing grades of carbon black specify a maximum amount of ash for the product. Apart from this requirement, however, it can be said that in general the ash content resulting from the use of the metallic elements in accordance with this invention do not have a deleterious effect upon cured rubber composition. I have noted that certain compounds of the stated metals result in the formation of an ash which affects the curing properties of the rubber composition in a minor fashion. However, particular compounds can be readily selected so as to minimize this effect or same may be actually taken advantage of in the formulation of the rubber composition. It is also significant to mention here that usually the amount of metal present in the completed black is approximately one-half of that quantity introduced into the carbon forming reaction zone. If one desires to prepare a carbon black in accordance with this invention which does not exceed the rubber industry-recognized maximum of ash content, then the amount of metal should not exceed about 50,000 parts per million of the carbon black formed.

In practice, it is more convenient to introduce the metal in amounts based on the amount of carbon producing feedstock used. Accordingly, on the assumption that approximately 4.5 pounds of HAF carbon black are obtained from a gallon of residual oil feedstock having a gravity less than about 10° API, the preferred maximum limit of metal is in the order of about 20,000 parts per million parts of said feedstock. In the production of the finer particle size carbon black, e.g., ISAF and SAF, where lower yields are experienced, the maximum amount of metal is correspondingly decreased.

In order to achieve uniformity in the final product, the structure modifiers, i.e., the metals of this invention or suitable compounds thereof, are to be added continuously to the reaction sphere at a rate commensurate with that of the injected feedstock. The introduction of the metal is best facilitated by introducing same in the form of their compounds. There are several satisfactory ways for introducing the metallic compound continuously and at a uniform rate depending on the nature of the compound. In the case of the oil soluble compounds, these may be dissolved in a normally liquid hydrocarbon feedstock and the solution injected directly into the reactor. On the other hand, solutions of water soluble metallic compounds can be added to a preheated feedstock and the resultant admixture can in turn be either atomized or introduced as such directly into the reactor. Aqueous or non-aqueous solutions of the structure modifying metallic compounds can also be separately injected within the reactor at the site where thermal dissociation of the hydrocarbon feedstock commences. The latter method of introducing the metallic compounds is also applicable for those compounds which are not completely soluble in either water or an organic solvent but are capable of forming dispersions therein. Suitable compounds of the metals of this invention include their chlorides, acetates, sulfates, nitrates, nitrites, carbonates, oxides, hydroxides, etc. Organo-metallic compounds suitable for use in the practice of this invention include the alkyl derivatives of the stated metals such as, for example, aluminum triethyl. Additionally, the corresponding metal salts of various organic acids such as fatty acids, dibasic acids, etc., can likewise be used.

Particularly preferred compounds of the structure modifying metals of this invention are represented by the organic sulfonate salts thereof. It has been found that the effectiveness of the stated metals in beneficially modifying the structural characteristics of the carbon black produced is enhanced by the use of the metals in such form. It is believed that the superior results obtained with the organic sulfonate salts is attributable to the property of such sulfonates to decompose at approximately the same rate as the feedstock under the conditions employed in the furnace process for producing carbon black. In order to realize maximum effectiveness, the sulfonate salt should be soluble or at least colloidally soluble in the carbon black producing feedstock. The use of oil-soluble salts not only provides for convenience in introducing the additive metals but also insures that there will continuously be a uniform concentration of metallic ions at the site where the bulk of the feedstock is dissociated.

There are a number of sulfonic acids that can be used to prepare the oil-soluble sulfonate salts of the metals herein concerned. These can be generally classified as either petroleum sulfonic acids or those derived synthetically from by-products of various petroleum operations. The petroleum sulfonic acids applicable are the mahogany acids. These acids are a complex mixture of aromatic and alicyclic sulfonic acids produced in the conventional sulfuric acid refining of lubricating oil distillates. The industrial production of mahogany sulfonic acids is well known in the art and such products are readily available as staple items of commerce.

Another class of sulfonic acids useful for preparing the oil-soluble sulfonate salts of the metals of this invention include the alkyl sulfonic acids obtained by sulfonating suitable olefinic streams produced in a variety of petroleum operations. Particularly suitable olefins for this purpose are those derived from cracking petroleum waxes or the dehydrochlorination of chlorinated wax products. Likewise, olefins obtained in the refining of gasoline can be dimerized to provide suitable stocks for sulfonation in preparing sulfonic acids useful in the practice of the instant aspect of my invention. Generally, the alkyl sulfonic acids should contain at least about 24 carbon atoms in order that the sulfonate salts derived therefrom exhibit satisfactory oil-soluble properties.

A further exemplary class of sulfonic acids useful in the practice of this invention include those obtained by sulfonating a synthetic alkaryl. These alkaryls are readily produced in accordance with the Friedel-Crafts reaction wherein an aromatic compound is condensed with either an olefin, alkyl halide or alcohol. Suitable arenes for this purpose include benzene, lower alkyl benzenes, naphthalene and the lower alkyl derivatives thereof. Applicable alkaryls whose metallic sulfonate salts are oil-soluble are those in which the alkyl group or groups attached to the aromatic nucleus total at least about 20 carbon atoms. The preferred alkylbenzenes are those having an average molecular weight from about 350 to 700.

An economical source of synthetic alkaryls which provide oil-soluble sulfonate salts of the metals herein concerned is a well known reaction by-product obtained in the production of detergent alkylates. Detergent alkylates are ordinarily prepared by reacting a propylene tetramer or an equivalent chain-length alkyl chloride with benzene. Upon recovery of the detergent alkylate fraction, a higher boiling fraction, generally called postdodecylbenzene, is recovered. The latter fraction is a complex mixture of alkylbenzenes and dialkylbenzenes representing excellent and inexpensive product for the production of oil-soluble sulfonate salts. Properties of a typical postdodecylbenzene fraction are as follows:

| | |
|---|---|
| Specific gravity at 38° C. | 0.8649 |
| Average molecular weight | 385 |
| Percent sulfonatable | 88 |
| A.S.T.M.D.—158 Engler: | |
| I.B.P. ° F | 647 |
| 5 ° F | 682 |
| 50 ° F | 715 |
| 90 ° F | 760 |
| 95 ° F | 775 |
| F.B.P. ° F | 779 |
| Refractive index at 23° C. | 1.4900 |
| Viscosity at: | |
| 10° C. centipoises | 2800 |
| 20 do | 280 |
| 40 do | 78 |
| 80 do | 18 |
| Aniline point ° C | 69 |
| Pour point ° F | −25 |

The preparation of the desired metallic salts of the above-described sulfonic acids is well known in the art. It is likewise known how to produce metallic salts of said sulfanic acids containing a colloidal dispersion of complexes of a metal corresponding to the anion portion of the salt. In some instances, it is possible to obtain a colloidal dispersion of the metal itself within the sulfonate. The foregoing dispersions are often referred to as overbased compostions in the lubricating oil art. These overbased sulfonates can be used to especial advantage in the practice of this invention.

In order to illustrate to those skilled in the art the preferred manner of carrying out the process of this invention, the following specific example is given in which all parts are parts by weight unless otherwise indicated. This example is presented primarily by way of illustration, and any enumeration of details contained therein should not be interpreted as a limitation of the invention except as indicated in the appended claims.

EXAMPLE

In this example, a plurality of carbon black production runs were made in which processing conditions were chosen so as to yield a HAF carbon black. The data presented herein primarily serve to illustrate the manner in and extent to which structure properties of an important commercial grade of carbon black can be beneficially modified using a representative metal of this invention; namely, aluminum. For comparative purposes, the other runs feature the use of the prior art metals barium and potassium. In each instance, a control run was made in which all conditions observed in the corresponding experimiental run were observed with the exception that the only extraneous material introduced into the reaction system consisted of water in the amount used in the corresponding run.

The reactor or furnace employed in this example substantially correspond to the apparatus disclosed and claimed in U.S. Patent 2,976,128. The apparatus of said patent is adapted for producing black by the process wherein "cyclonic flow conditions" are observed, all in accordance with that discussed hereinbefore. One of the principal advantages residing in the use of this apparatus is that the predominant portion of the combustion air employed to produce the turbulent combustion mixture is beneficially preheated by virtue of the indirect heat exchange provision provided between the incoming combustion air and the effluent of the cracking zone. In this example, a commercial version of such a reactor was employed wherein the fuel gas-feedstock injection assembly was slightly modified in that the feedstock was introduced through a standard open-end pipe disposed within and removed rearwardly from the open end of an encasing pipe communicating with the interior of the reactor.

In each run, combustion air in the amount of 150,000 s.c.f.h. was tangentially introduced near the downstream extremity of the reactor into the annular spacing between the reactor proper and the outer housing. The apparatus was provided with a water quench for cooling the reactor effluent. The carbon black content of the cooled effluent was then removed using a conventional recovery system.

Under operating conditions, the combustion air introduced as described was preheated to a temperature in the order of 900° F. just prior to mixing with the injected fuel gas (natural gas). Additionally, center or annulus air in the amount of about 5,000 s.c.f.h. was axially introduced into the reactor about the feedstock inlet pipe. The fuel gas was introduced through the burner in such an amount so as to provide a total air-to-gas ratio of about 15:1.

The feedstock employed in this example was a residual oil having the following characteristics:

*Residual oil*

| | |
|---|---|
| °API gravity | 2.3 |
| Viscosity S.S.F. @ 122° F. | 102 |
| Ash percent | 0.1 |
| Sulfur do | 1.43 |
| Carbon do | 89.77 |
| Hydrogen do | 8.26 |
| H/C atomic ratio | 1.1 |
| Boiling point (ASTM) characteristics: | |
| Initial B.P. ° F | 600 |
| 10% ° F | 640 |
| 20% ° F | 654 |
| 30% ° F | 675 |
| 40% ° F | 695 |
| 50% ° F | 715 |
| 60% ° F | 735 |
| 70% | Commenced to crack |

The residual oil feedstock was preheated to a temperature of about 700° F. and introduced into the reactor at a rate so as to yield approximately 1,200 lb./hr. of carbon black. This rate was in the order of 290 gal./hr.

In each of the experimental runs, the structure modifying metal was added in the form of an aqueous solution of a water-soluble compound thereof. The concentration of the respective solutions and the rates employed are given in Table I set forth hereinbelow. Again it is mentioned that a control run was made corresponding to each of the experimental runs wherein a structure modifying metal was employed. Details with regard to each control run are set forth in the column in Table I just preceding the experimental run column to which it relates.

The aqueous solution of the structure modifier or the water used in control runs was added in each instance to the mixture of center air and heated feedstock just prior to the introduction of this mixture into the reactor. The rate of such addition was controlled by a suitable proportionating pump.

The data obtained for the various runs of this example are given in the following Table I. The modulus characteristics of the experimental blacks are set forth on a relative basis, that is, in terms of the percent of the value observed for the control. The modulus ratings were derived using the ASTM rubber recipe.

ulating and controlling the structural characteristics of the resultant carbon black which comprises: continuously introducing into the reaction zone, along with the hydrocarbon feedstock, a compound of a metal selected from the group consisting of aluminum, indium, gallium and mixtures thereof in a measured amount which is sufficient to impart the desired structural characteristics to the carbon black produced.

5. A process in accordance with claim 4 wherein said hydrocarbon feedstock is a residual oil.

6. A process in accordance with claim 5 wherein said compound of the metal is an oil-soluble organic sulfonate salt thereof.

7. A process in accordance with claim 6 wherein said oil-soluble organic sulfonate is the sulfonate salt of a synthetic alkaryl.

8. A process in accordance with claim 7 wherein said alkaryl is an alkylbenzene having an average molecular weight of from about 350 to 700.

9. A process in accordance with claim 8 wherein said alkylbenzene is postdodecylbenzene.

10. A process in accordance with claim 6 wherein said metal is a mixture of gallium and indium.

11. A process in accordance with claim 6 wherein said metal is aluminum.

12. A process in accordance with claim 6 wherein said oil-soluble organic sulfonate is a mahogany sulfonate.

TABLE I

| Run | A | B | C | D | E | F |
|---|---|---|---|---|---|---|
| Additive | Water | KOH Solution | Water | $Ba(NO_2)_2$ Solution | Water | $AlCl_3$ Solution |
| Rate of Additive Addition (gallons per hr.) | 30 | 30 | 30 | 30 | 3 | 3 |
| Salt Conc. of Additive (lbs./gal. solution) | 0 | 0.037 | 0 | 0.6 | 0 | 0.6 |
| Carbon Black Yield (lbs./hr.) | 1,200 | 1,200 | 1,200 | 1,200 | 1,200 | 1,200 |
| P.p.m. Metal Based on Carbon Black Yield | 0 | 64 | 0 | 900 | 0 | 300 |
| Modulus Rating (percent) | 100 | 89.4 | 100 | 89.2 | 0 | 95.2 |

I claim:

1. A process for producing low structure carbon black which comprises injecting a vaporous hydrocarbon feedstock into a reaction zone continuously maintained at a temperature sufficient to instantaneously crack a major portion of the injected said stock into carbon black while concomitantly and proportionally introducing into said reaction zone from about 50 to 100,000 p.p.m. based on the weight of the carbon black yield of a metal selected from the group consisting of gallium, indium, aluminum and mixtures thereof, cooling the effluent from the reaction zone and recovering the carbon content thereof.

2. A process in accordance with claim 1 wherein said feedstock is a normally liquid hydrocarbon.

3. A process in accordance with claim 2 wherein said feedstock is a residual oil.

4. In a process for preparing carbon black by thermally decomposing a normally liquid hydrocarbon feedstock in a reaction zone, the improved method for reg-

References Cited by the Examiner

UNITED STATES PATENTS

| 2,585,520 | 2/1952 | Van Ess et al. | 44—68 X |
| 2,626,207 | 1/1953 | Wies et al. | 44—68 |
| 2,922,709 | 1/1960 | Hetzel | 23—209.4 X |
| 3,010,794 | 11/1961 | Friauf et al. | 23—209.4 |
| 3,085,866 | 4/1963 | Gay et al. | 44—68 X |
| 3,117,016 | 1/1964 | Smith | 106—307 |
| 3,201,200 | 8/1965 | Voet et al. | 23—209.4 |

FOREIGN PATENTS

| 339 | 1854 | Great Britain. |
| 361,837 | 11/1931 | Great Britain. |

OSCAR R. VERTIZ, *Primary Examiner.*

E. J. MEROS, *Assistant Examiner.*